(12) United States Patent
Sfar et al.

(10) Patent No.: US 11,661,974 B2
(45) Date of Patent: May 30, 2023

(54) TORQUE TRANSMISSION DEVICE

(71) Applicant: Renk Aktiengesellschaft, Augsburg (DE)

(72) Inventors: Mohamed Sfar, Hörstel (DE); Andreas Thesing, Rheine (DE); Matthias Drerup, Neuenkirchen (DE)

(73) Assignee: RENK GMBH, Augsburg (DE)

( * ) Notice: Subject to any disclaimer, the term of this patent is extended or adjusted under 35 U.S.C. 154(b) by 379 days.

(21) Appl. No.: 16/758,360

(22) PCT Filed: Oct. 22, 2018

(86) PCT No.: PCT/EP2018/078928
§ 371 (c)(1),
(2) Date: Apr. 22, 2020

(87) PCT Pub. No.: WO2019/081444
PCT Pub. Date: May 2, 2019

(65) Prior Publication Data
US 2020/0256398 A1 Aug. 13, 2020

(30) Foreign Application Priority Data

Oct. 24, 2017 (DE) ...................... 10 2017 124 829.3

(51) Int. Cl.
*F16D 7/02* (2006.01)
*F03D 15/00* (2016.01)
*F16D 3/78* (2006.01)

(52) U.S. Cl.
CPC ............. *F16D 7/021* (2013.01); *F03D 15/00* (2016.05); *F16D 3/78* (2013.01); *Y10T 403/13* (2015.01)

(58) Field of Classification Search
CPC . F16D 7/021; F16D 3/78; F03D 15/00; Y10T 403/13
USPC ...................................................... 464/30, 99
See application file for complete search history.

(56) References Cited

U.S. PATENT DOCUMENTS

| | | | | |
|---|---|---|---|---|
| 2,618,136 A | * | 11/1952 | Wellauer | ................. F16D 7/025 |
| 2,709,903 A | * | 6/1955 | Hallewell | ................. F16D 3/14 |
| 2,783,628 A | * | 3/1957 | Hallewell | ............. F16D 43/286 |
| 3,230,741 A | * | 1/1966 | Bruyere | .................. F16D 47/02 |
| 7,025,185 B2 | * | 4/2006 | Nagayama | ............. F16D 7/021 |
| | | | | 464/30 |
| 2017/0241484 A1 | | 8/2017 | Bonte et al. | |

FOREIGN PATENT DOCUMENTS

| | | |
|---|---|---|
| DE | 86 33 885 | 5/1990 |
| DE | 696 26 669 | 1/2004 |
| DE | 11 2004 002 516 | 8/2017 |
| EP | 0 816 703 | 1/1998 |

* cited by examiner

*Primary Examiner* — Greg Binda
(74) *Attorney, Agent, or Firm* — Cozen O'Connor

(57) ABSTRACT

A torque-transmitting apparatus for a drive assembly includes: a first coupling device for transmitting torque and compensating a shaft offset, and a second coupling device for transmitting and limiting torque, the first and second coupling devices being connected in series. The second coupling device includes an inner hollow part and an outer hollow part. The inner hollow part radially outwardly includes a first frictional surface and the outer hollow part radially inwardly includes a second frictional surface, which is connected to the first frictional surface and interacts therewith. The inner hollow part includes a fillable pressure chamber.

8 Claims, 2 Drawing Sheets

TORQUE TRANSMISSION DEVICE

CROSS REFERENCE TO RELATED APPLICATIONS

This is a U.S. national stage of International application No. PCT/EP2018/078928, filed on Oct. 22, 2018, which claims priority to German Application No. 10 2017 124 829.3, filed Oct. 24, 2017, the content of each of which is incorporated herein by reference.

BACKGROUND OF THE INVENTION

1. Field of the Invention

The invention relates to a torque transmission device.

In wind power plants and other drive arrangements, torque transmission devices are used which serve for transmitting a torque from a first, in particular drive-side shaft to a second, in particular output-side shaft. It is already known from practice that such a torque transmission device comprises multiple coupling devices, namely a first coupling device, which serves for the torque transmission and a shaft offset compensation between the two shafts, and a second coupling device, which serves for the torque transmission and a torque limitation. The two coupling devices are connected behind one another or in series so that the torque to be transmitted from the drive-side shaft in the direction of the output-side shaft has to be transmitted by both coupling devices.

In torque transmission devices known from practice, the second coupling device, which serves for the torque transmission and torque limitation, is typically embodied as a torque-limiting slip element. When a torque is exceeded, a slipping of the slip element occurs, by way of which the torque limitation is provided.

There is a need for a torque transmission device which, on the one hand, is of a simple construction, and on the other hand, can reliably transmit torques and limit torques to be transmitted.

SUMMARY OF THE INVENTION

Starting out from this, it is an object of the present invention to create a new type of torque transmission device.

This object may be achieved through a torque transmission device.

According to an aspect of the invention, the device has the second coupling device that comprises an inner part formed as a hollow component and an outer part formed as a hollow component. The inner part of the second coupling device comprises a first friction surface radially outside and the outer part of the second coupling device comprises a second friction surface radially inside adjoining the first friction surface radially outside and interacting with the first friction surface. The inner part of the second coupling device comprises a pressure chamber that can be filled with a pressure medium, via which for providing the torque limitation, a torque that is maximally transmittable by the friction surfaces is adjustable.

By way of the second coupling device with the interacting friction surfaces, which are pressed against one another with the help of the pressure chamber that can be filled with the pressure medium, torque can be reliably transmitted and also limited.

The two parts of the second coupling device, i.e., the inner part and the outer part, which provide the two friction surfaces, are each embodied as a hollow component. This has the advantage that wear on the second coupling device that may form during operation can be at least partly compensated automatically through automatic springing-back of the inner part of the second coupling device. This makes possible a particularly reliable torque transmission and torque limitation even in the presence of a certain amount of wear of the second coupling device.

According to an advantageous further development, the inner part on a side comprises a protrusion directed to the outside, which forms a stop for a side of the outer part and/or comprises a pressure connection for the pressure chamber. In this manner, a defined axial position between the two parts of the second coupling device can be ensured on the one hand and the pressure in the pressure chamber can be adjusted via the pressure connection even during the operation on the other hand.

Preferentially, the pressure present during the operation is adjustable and variable preferentially via the pressure connection. In particular the pressure present in the pressure chamber can be reduced to zero during the operation via the pressure connection and by way of this the second coupling device disconnected regarding torque transmission or power flow. In this manner, a particularly advantageous operation of the torque transmission device is possible.

The torque transmission device is preferentially part of a drive arrangement of a wind power plant. The use of the torque transmission device in wind power plants is particularly preferred.

BRIEF DESCRIPTION OF THE DRAWINGS

Preferred further developments of the invention are obtained from the following description. Exemplary embodiments of the invention are explained in more detail by way of the drawings without being restricted to this.

In the drawings.

DETAILED DESCRIPTION OF THE PRESENTLY PREFERRED EMBODIMENTS

The invention relates to a torque transmission device.

Figure 1:
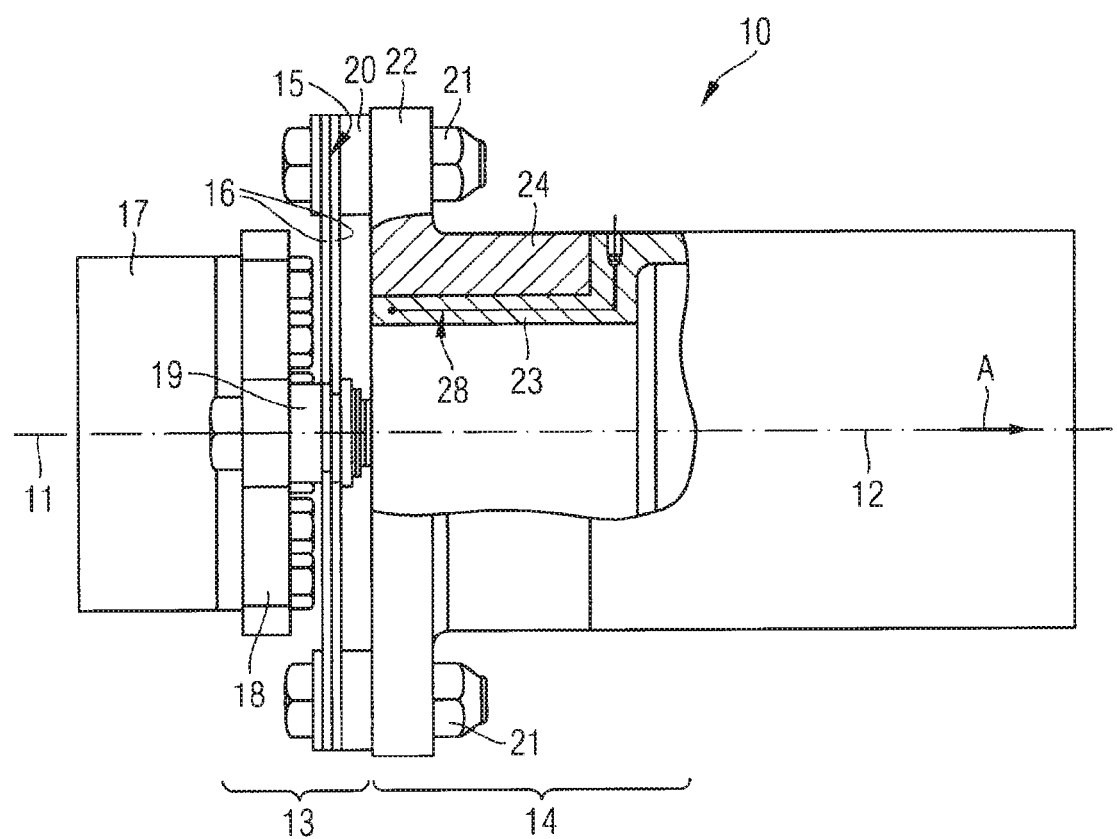
FIG. 1: is a torque transmission device in partial cross section.

FIG. 1 shows a lateral view of a torque transmission device 10 for a drive arrangement, preferentially of a wind power plant, which serves for transmitting a torque from a first, in particular drive-side shaft (which is not shown) to a second, in particular output-side shaft (which is not shown). In FIG. 1, merely a longitudinal axis and thus axis of rotation 11 of the first shaft and a longitudinal axis and thus axis of rotation 12 of the second shaft are shown.

The torque transmission device 10 according to the invention comprises a first coupling device 13 and a second coupling device 14 connected in series with the first coupling device 13, so that accordingly both coupling devices 13, 14 are connected one behind the other.

The first coupling device 13 serves for the torque transmission and a shaft offset compensation between the two shafts, namely the axes of rotation 11, 12 of the two shafts.

In the illustrated exemplary embodiment, the first coupling device 13 is provided by a disc coupling, which comprises a disc pack 15 of multiple discs 16, which are pressed together seen in the axial direction A of the shafts or axes of rotation 11, 12. According to one aspect, the first coupling device (13) is a non-shiftable disc coupling. Accordingly, FIG. 1 shows a flange 17 with a flange plate 18, wherein the flange 17 connects the torque transmission device 10 to the first shaft, which is not shown. The discs 16 are in connection with the flange blade 18 of the flange 17 via a spacer bushing 19, wherein the spacer bushing 19 extends through a central, inner region of the discs 16 of the disc pack 15. The spacer bushings 19 and 20 are arranged outside. Through the front view, the spacer bushing 19 is in alignment with the axis of rotation 11.

On a radially outer section, the discs 16 of the disc pack 15 are attached to a flange 22 of the second coupling device 14 via a spacer bushing 20 and screws 21.

The second coupling device 14, like the first coupling device 13, serves for the torque transmission and furthermore a torque limitation of the transmittable torque.

Figure 2:
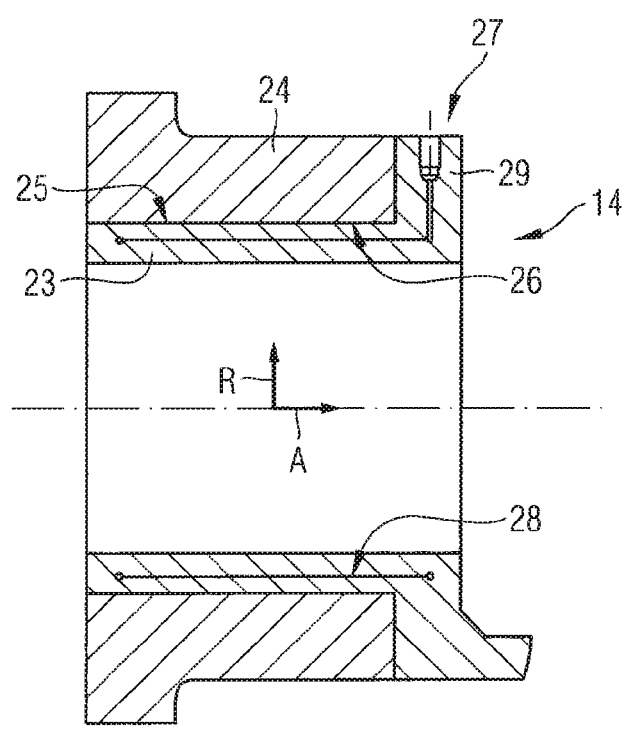
FIG. 2: is a detail of the torque transmission device according to FIG. 1.

The second coupling device 14 comprises an inner part 23 formed as a hollow component and an outer part 24 formed as a hollow component. FIG. 2 shows these two parts 23, 24 of the second coupling device 14 formed as hollow components in the cross section in sole representation.

The inner part formed as hollow component comprises a first friction surface 25 radially outside. The outer part 24 comprises a second friction surface 26 radially inside. Seen in the radial direction R, these two friction surfaces 25, 26 adjoin one another and interact for torque transmission and torque limitation. A frictional force between these cylindrical or conical friction surfaces 25, 26, which radially adjoin one another, defines the maximum torque transmittable by the second coupling device 14.

A pressure chamber 28 that can be filled with a pressure medium is introduced into the inner part 23. The pressure chamber 28 serves for adjusting the maximum torque transmittable by the friction surfaces and accordingly for providing the torque limitation, namely in that the pressure chamber 28 is filled with a defined pressure medium pressure, which defines the pressure between the interacting friction surfaces 25, 26 of the two parts 23, 24 of the second coupling device 14.

Should the moment present at the torque transmission device 10 become greater than the moment transmittable as a consequence of the pressure between the friction surfaces 25, 26 of the two parts 23, 24 of the second coupling device, the second coupling device 14 slips and limits the torque for overload protection.

Should in the process, material be removed as a consequence of wear in the region of the friction surfaces 25, 26 of the two parts 23, 24 of the second coupling device 14, which actually leads to a reduction of the pressure between the friction surfaces 25, 26 and thus to the reduction of the torque that is transmittable with the filling pressure of the pressure chamber 28 remaining the same, this can be partly compensated because the inner part 23 of the second coupling device 14 is embodied as a hollow component, namely in that the inner part 23 elastically springs back to radially outside.

For filling the pressure chamber 28 with pressure medium, a pressure connection 27 is provided. Here, the pressure connection 27 is introduced into a protrusion 29 of the inner part 23 of the second coupling device 14 directed to radially outside.

This protrusion 27, furthermore, provides an axial stop for the outer part 24 to thereby provide a defined relative position in the axial direction between the two parts 23, 24 of the second coupling device 14.

During the operation of the torque transmission device 10, the pressure present in the pressure chamber 28, and thus the surface pressure between the two friction surfaces 25, 26 of the two parts 23, 24 of the second coupling device 14 can be adjusted via the pressure connection 27, in particular also reduced to zero, to disconnect the second coupling device in case of a pressure in the pressure chamber reduced to zero and then interrupt the torque transmission emanating from the first, drive-side shaft in the direction of the second, output-side shaft. In this manner, a particularly advantageous operation is possible while maintenance operations can also be carried out easily.

Accordingly, the torque transmission device 10 according to an aspect of the invention comprises the second coupling device 14, which provides a kind of hydraulic clamping element with the two parts 23, 24. The two parts 23, 24 are each embodied as hollow components. In the inner part 23 formed as hollow component, the pressure chamber 28 is introduced. When pressure is applied to the pressure chamber 28 of the inner part 23, the inner part 23 is deformed elastically. The volume of the pressure chamber 23 is enlarged, the radially outer friction surface 25 of the inner part 23 is pressed to radially outside against the radially inner friction surface 26 of the outer part 24. In the case of wear on the friction surfaces 25, 26 pressed against one another, the inner part 23 formed as hollow component can elastically spring back to the outside. Because of this, a wear-induced reduction of the surface pressure between the friction surfaces 25, 26 can be at least partly compensated.

The torque transmission device 10 according to an aspect of the invention is particularly advantageously employed in wind power plants in order, for example, to avoid overloading the same caused through gusts of wind.

The torque transmission device can also be employed in rolling mills for steel, ship's drives or other drive arrangements, but use in wind power plants is preferred.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMBERS

10 Torque transmission device
11 Axis of rotation
12 Axis of rotation
13 Coupling device
14 Coupling device
15 Disc pack
16 Disc
17 Flange
18 Flange blade
19 Spacer sleeve
20 Spacer sleeve
21 Screw 22 Flange
23 Inner part
24 Outer part
25 Friction surface
26 Friction surface
27 Pressure connection
28 Pressure chamber
29 Protrusion

The invention claimed is:

1. A torque transmission device for a drive arrangement for transmitting a torque from a first shaft to a second shaft, comprising:
   a first coupling device (13), configured to transmit the torque and to compensate for an offset between the first and second shaft; and
   a second coupling device (14), configured to transmit and limit the torque,
   wherein:
   the first coupling device (13) and the second coupling device (14) are connected in series,
   the second coupling device (14) comprises a hollow inner part (23) and a hollow outer part (24), wherein the hollow inner part (23) is directly axially and radially adjacent to the hollow outer part (24),
   the hollow inner part (23) comprises, at a radially outer portion of the hollow inner part (23), a first friction surface (25), and the hollow outer part (24) comprises, at a radially inner portion of the hollow outer part (24), a second friction surface (26), the second friction surface (26) being arranged radially outside and adjoining the first friction surface (25) and interacting with the first friction surface (25), and
   the hollow inner part (23) further comprises a pressure chamber (28) fillable with a pressure medium, via which, for limiting the torque, a maximum torque transmittable by the friction surfaces is adjustable,
   wherein the hollow inner part (23) further comprises a radially outwardly directed protrusion (29) configured as a stop for a side of the hollow outer part (24) such that an entire axial face of the protrusion (29) is in direct contact with an entire axial face of the hollow outer part (24),
   wherein an entire radially outer circumferential surface of the first friction surface (25) is in direct contact with an entire radially inner surface of the hollow outer part (24).

2. The torque transmission device according to claim 1, wherein the hollow outer part (24), on an opposite side, thereof further comprises a flange (22) configured to connect to the first coupling device (13).

3. A drive arrangement of a wind power plant comprising the torque transmission device according to claim 1.

4. A torque transmission device for a drive arrangement for transmitting a torque from a first shaft to a second shaft, comprising:
   a first coupling device (13), configured to transmit the torque and to compensate for an offset between the first and second shaft; and
   a second coupling device (14), configured to transmit and limit the torque,
   wherein:
   the first coupling device (13) and the second coupling device (14) are connected in series,
   the second coupling device (14) comprises a hollow inner part (23) and a hollow outer part (24), wherein the hollow inner part (23) is directly axially and radially adjacent to the hollow outer part (24),
   the hollow inner part (23) comprises, at a radially outer portion of the hollow inner part (23), a first friction surface (25), and the hollow outer part (24) comprises, at a radially inner portion of the hollow outer part (24), a second friction surface (26), the second friction surface (26) being arranged radially outside and adjoining the first friction surface (25) and interacting with the first friction surface (25), and
   the hollow inner part (23) further comprises a pressure chamber (28) fillable with a pressure medium, via which, for limiting the torque, a maximum torque transmittable by the friction surfaces is adjustable,
   wherein the hollow inner part (23) further comprises a radially outwardly directed protrusion (29) configured as a stop for a side of the hollow outer part (24),
   wherein the hollow outer part (24), on an opposite side, thereof further comprises a flange (22) configured to connect to the first coupling device (13),
   wherein the hollow inner part (23) further comprises a pressure connection (27) configured to fill the pressure chamber (28) with a pressure medium.

5. The torque transmission device according to claim 4, wherein the pressure connection (27) is introduced into the protrusion (29) of the hollow inner part (23) directed to radially outside.

6. The torque transmission device according to claim 5, wherein the pressure connection (27) is configured to adjust and vary the pressure present in the pressure chamber (28) during operation of the torque transmission device by removal or filling of the pressure medium from the pressure chamber (28).

7. The torque transmission device according to claim 6, wherein the pressure connection (27) is further configured to reduce the pressure present in the pressure chamber (28) to zero to thereby disconnect the second coupling device (14) due to the removal of the pressure medium from the pressure chamber (28).

8. The torque transmission device according to claim 7, wherein the first coupling device (13) is a non-shiftable disc coupling.

* * * * *